Nov. 2, 1965 H. J. CVETKO ETAL 3,215,785

STEREOPHONIC PIEZOELECTRIC PICKUP CARTRIDGE

Filed Dec. 23, 1958

INVENTORS

HENRY J. CVETKO

MAURICE M. PALO

BY Francis J. Klempay

ATTORNEY 3,215,785
Patented Nov. 2, 1965

3,215,785

STEREOPHONIC PIEZOELECTRIC PICKUP CARTRIDGE

Henry J. Cvetko, Geneva, and Maurice M. Palo, Conneaut, Ohio, assignors to The Astatic Corporation, Conneaut, Ohio, a corporation of Ohio Filed Dec. 23, 1958, Ser. No. 782,571
3 Claims. (Cl. 179—100.41)

The present invention relates generally to the art of sound recording and reproducing and more particularly to the provision of an improved stereophonic phonograph pickup cartridge.

As will be understood by those skilled in the art, there are two general systems for the recording and reproduction of binaural or stereophonic sound. The first of these general systems, which is the earliest disclosed in the prior art and is the most obvious, is based on the concept of recording sound in two separate record traces or grooves. To reproduce the sound a conventional pickup cartridge—comprising an operative stylus and a transducer element—is provided for each of the record traces or grooves. The second of these systems involved simultaneously recording two channels of sound in a single record groove or trace. In the reproduction apparatus a single pickup cartridge embodying a single operative record groove engaging stylus and a pair of transducer elements is employed.

The second of these general systems is subject to two general divisions based on different methods of functioning. One of these divisions utilizes a pair of electromechanical recorders, one of which operates in a "hill and dale" mode while the other operates in a "lateral" mode, to record two channels of sterophonic sound in a single record groove or trace. The other general division envisions the recording of two channels of sterophonic sound on the slanting side walls of a ninety degree V-shaped record groove or trace and comprises a further modulation of the side walls in directions downwardly at angles of forty-five degrees with respect to the surface of the record disc. This latter division is commonly known by the designation "45–45" in the art and is the system which is now enjoying substantial commercial success.

In providing a phonograph pickup cartridge for reproducing 45–45 stereophonic or binaural records it is, according to prior art teaching, customary to incorporate two separate transducer elements and to couple them to a single operative needle tip or stylus by means of a lever system. The lever system is such that each of the transducer elements is driven only in response to undulations in its respective side wall of the record groove or trace and physical signals from the other side wall are allowed to dissipate themselves in the lever system without effecting the instant transducer element. The lever system usually employed in such prior art 45–45 stereophonic phonograph pickup cartridges is rather complex, comprising large leverage and yoke members fabricated from resilient compliant materials, in order that it may be capable of transmitting the physical signals from the side walls of the record groove or trace to their respective transducer elements. When such a leverage system is utilized a great quantity of spaced is required, the overall operating characteristics of the pickup cartridge are poor and the cost of the pickup cartridge is prohibitive for the mass market.

The stereophonic phonograph pickup cartridge of the present invention will be described, and is specifically adapted for use with, the 45–45 system of recording and reproducing stereophonic sound, but it should be understood from the outset that the teachings of the present invention are equally applicable to phonograph pickup cartridges designed for other binaural or stereophonic systems and, in fact, to phonograph pickup cartridges used in monaural systems of recording and reproducing sound.

It is a prime object of the present invention to provide a stereophonic phonograph pickup cartridge for use in reproducing stereophonic sound recordings which permit substantial reductions in size, complexity and cost but yet is characterized by improved operating characteristics.

It is a further object of the invention to provide improved coupling means for connecting the operative stylus or record tip with the two transducer elements which is operative to faithfully transmit the signals from the two channels of stereophonic sound in the record groove to their respective transducers. The present invention provides means for driving both of the transducer elements from the stylus or record tip which comprises a single nose piece of extremely simple and highly improved design which is securely mounted on and carried by the forward ends of the transducer elements and directly mounts the record engaging stylus or record tip. The use of such a nose piece eliminates the need of the complicated lever systems which have been almost universally employed in prior art stereophonic phonograph pickup cartridges and consequently allows substantial reductions in size, space requirements and cost. In addition, the nose piece used in the stereophonic phonograph pickup cartridge of the present invention is characterized by its ability to transfer the physical movements of the record groove engaging stylus or record tip to the transducer elements in a highly efficient manner.

Another object of the present invention is to provide a stereophonic phonograph pickup cartridge wherein each of the transducer elements is driven only by the signal from the stereophonic channel on its respective side wall of the record groove or trace whereby maximum channel separation is obtained. A design requirement of extreme importance in the fabrication of a stereophonic phonograph pickup cartridge is that of providing means for achieving good channel separation between the two channels of stereophonic sound. One transducer element must not respond to signals intended for the other of the transducer elements or, conversely, each of the transducer elements must be driven only in response to the physical signals derived from its associated stereophonic sound channel. The channel separation, expressed in signal level difference of the two outputs of the transducer elements, is a measure or index of the quality of the stereophonic phonograph pickup cartridge.

In connection with the above object, it is another object of the invention to teach an improved manner of positioning and mounting the two transducer elements. As will be hereinafter more fully explained, the transducer elements are positioned in a highly unorthodox and unobvious manner and mounted in an improved fashion whereby maximum channel separation is maintained.

A further object of the invention is to provide a stereophonic phonograph pickup cartridge which exhibits a high degree of mechanical compliance. The inclusion of a marked degree of mechanical compliance is of importance in a phonograph pickup cartridge in that it is an index of the ability of the cartridge to track the record groove faithfully at moderate needle pressures. High compliance in the vertical direction is built into the stereophonic phonograph pickup cartridge of the present invention while yet providing maximum channel separation as set forth above.

A still further object of the invention is to provide a stereophonic phonograph pickup cartridge which is characterized by its high compliance but yet compressive forces applied to the two transducer elements are kept at an absolute minimum. The transducer elements are mounted by resilient and elastic members in such a manner that the forces absorbed thereby are applied in shear as opposed to tension or compression.

Another object of the invention is to provide a phonograph pickup cartridge of the type above described in which radiated stylus noise is kept at a minimum. Such noise, or "needle-talk" as it is called in the art, is almost invariably the result of allowing too great a mass of the phonograph pickup cartridge to react against the surface of the record disc, thus causing it to radiate unwanted noise as it will do because of its large, hard and live-character. This problem is effectively eliminated in the stereophonic phonograph pickup cartridge of the present invention by providing a stylus holding nose piece of resilient compliant material which presents a very slight effective mass to the surface of the record disc.

Yet another object of the invention is to provide a stylus or record tip holding nose piece which not only exhibits desired degrees of vertical flexibility but also is designed to resist torsional bending.

An additional and important object of the invention is to provide a stereophonic phonograph pickup cartridge which embodies improved means for effecting electrical connections with the conductive coatings on the sides of the transducer elements.

A further object of the invention is to provide a stereophonic phonograph pickup cartridge which is of such size and so designed that the same is adapted to directly replace a wide variety on monaural phonograph pickup cartridges without costly and time consuming modifications.

Another object of the invention is to teach new and improved methods of manufacturing and assembling stereophonic phonograph pickup cartridges.

The above, as well as other objects and advantages of the present invention, will become more readily apparent upon consideration of the following specification and accompanying drawing wherein there is disclosed a preferred embodiment constructed in accordance with the teachings of the invention.

Figures 1, 2:
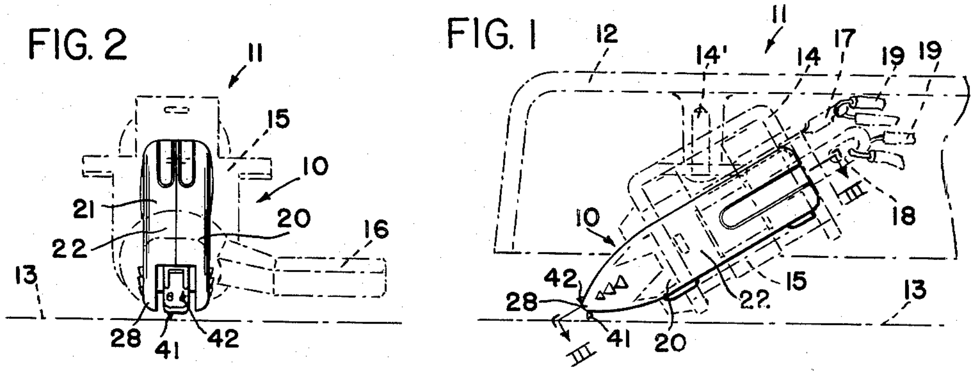
FIGURE 1 is a side elevational view of a stereophonic phonograph pickup cartridge constructed in accordance with the teaching of the present invention mounted in operative relation in a phonograph tone arm assembly which is depicted in broken lines.
FIGURE 2 is a front end view of the apparatus shown in FIGURE 1.

Referring now to the drawing, and initially to FIGURES 1 and 2 thereof, the reference numeral 10 designates generally a stereophonic phonograph pickup cartridge constructed in accordance with the teachings of the present invention which is mounted in the outer free end of a phonograph tone arm assembly 11. The tone arm assembly 11 comprises an elongated tone arm 12 which is mounted on one end by means, not shown, for universal pivotal movement whereby the stereophonic phonograph pickup cartridge mounted in the other end thereof is adapted to accurately follow the continuous and spiralling groove or trace in the surface of a record disc 13. Mounted in the free end of the tone arm 12 by screws 14' in inclined relation with respect to the plane of the record disc 13 is a U-shaped mounting bracket 14. The bracket 14 serves as a support for a rotatable cartridge holder 15 which is journaled therein for rotation about its own longitudinal axis. The axis of the cartridge holder 15 is inclined downwardly with respect to the horizontal plane of the record disc 13 and this member is provided with a laterally extending operator 16 whereby the cartridge holder can be rotated about its axis through an arc of one hundred and eighty degrees. The cartridge holder 15 is also provided with two pairs of electrical terminals 17 and 18 at the rear thereof which are electrically connected to suitable amplifying apparatus, not shown, by means of a plurality of leads 19 that extend the length of the tone arm 12. Rigidly received by spring action within the holder 15 is the stereophonic phonograph pickup cartridge 10 of the present invention.

The stereophonic phonograph pickup cartridge serves as a means for converting the undulations in the side walls of the continuous groove in the surface of the record disc to proportional electrical signals which appear at the two pairs of terminals 17 and 18. The electrical signals at the pairs of terminals—one signal representing one channel of stereophonic sound and the other signal representing the other channel—are conducted to suitable amplifying apparatus by means of the leads 19. In FIGURES 1 and 2 of the drawing the tone arm assembly 11 and the record disc 13 are depicted in broken lines while the stereophonic phonograph pickup cartridge is shown in full line to better show the mounting and construction of the stereophonic phonograph pickup cartridge.

Considering now the stereophonic phonograph pickup cartridge of the present invention which is depicted in detail in FIGURES 3–11 of the drawing, it comprises a pair of housing halves 20 and 21 formed by molding or other means from a suitable plastic material or the like. Each of the housing halves 20 and 21 has an internal cavity therein which, when the housing halves are assembled to provide a cartridge housing 22, define an internal cavity 23 which is substantially cylindrical throughout its center portion 24. At the left end of the internal cavity 23 the top and bottom walls of the housing halves 20 and 21 are turned inwardly and terminate in vertically spaced parallel straight radiused edges 25. The respective side walls of the housing halves 20 and 21 taper inwardly and are squared at 26 to provide in conjunction with the straight radiused edges 25 a front portion 27 of the internal cavity 23 which is substantially square. Both side walls of the housing halves extend forwardly an appreciable distance beyond the front portion 27 of the internal cavity 23 and the lower and upper edges of these side walls are smoothly curved toward each other until they meet at the radiused forward edges 28 that are provided to afford a kind of a bumper.

The extreme right or rear end of the internal cavity 23 is formed in a rear portion 29 of hexagonal shape. It is preferred that the rear portion 29 be so formed that the hexagon is disposed with one of its apices lying on the abutting faces of the housing halves 20 and 21 as is clearly shown in FIGURES 6 and 11 of the drawing. The reason for the rear portion 29 of the internal cavity 23 being shaped as a hexagon will be hereinafter more fully explained. It will thus be seen that the housing halves 20 and 21, when assembled, provide a cartridge housing 22 having an internal cavity 23 therein which comprises a front portion 27 of square shape, a center portion 24 of cylindrical shape and a rear portion 29 of hexagonal shape.

The operating component parts of the stereophonic phonograph pickup cartridge 10 are housed principally within the internal cavity 23 and comprise a pair of elongated transducer elements 30 and 31, a clamping bushing 32, a bender bushing 33 and a nose piece or coupling member 34. Since the stereophonic phonograph pickup cartridge operates on piezoelectric principles the construction and operation of the transducer elements 30 and 31 will first be described. The two transducer elements 30 and 31 are each complete integral mechanical-electrical transducers and each comprises two strips of piezoelectric material 35, such as properly cured ceramic compositions or any of the well known natural crystalline substances exhibiting piezoelectric properties, for example, which are securely bonded to a center vane 36, preferably a thin sheet of brass, and which are polarized to orientate the domains thereof in such fashion that they are electrically active. The outer major faces of each of the transducer elements are coated with conductive material, not particularly shown, to afford the connection of electrical leads thereto in a manner to be later explained. It is an inherent property of the transducer elements that they convert mechanical stresses into proportional electrical voltages which appear across the conductive coatings thereon. As one of the transducer elements 30 or 31 is bent in the direction of its major faces an electrical signal proportional to this bending is evidenced across the conductive coatings. When the transducer element is bent in the opposite direction with respect to its major faces the potential across the conductive coating reverses in an electrical sense. For all practical purposes the transducer elements 30 and 31 are insensitive to bending forces applied in the directions of their minor faces because of the substantial width dimensions of the major faces thereof.

Figures 7, 8, 9, 10, 11:
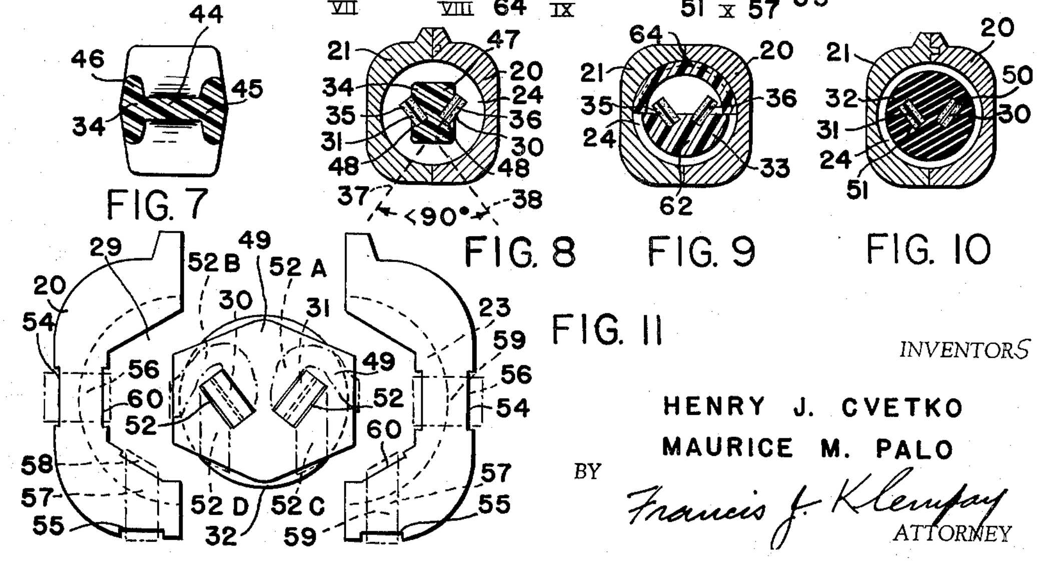
FIGURES 7, 8, 9 and 10 are end sectional views taken along the section lines VII—VII, VIII—VIII, IX—IX and X—X, respectively, of FGURE 4.
FIGURE 11 is an enlarged and exploded end view of the stereophonic phonograph pickup cartridge showing particularly the means for effecting electrical connection with the conductive surfaces of the transducer elements.

The stereophonic phonograph pickup cartridge of the present invention is designed for use with a stereophonic record disc wherein the two modulated channels of stereophonic sound are disposed on the side walls of a ninety degree V-shaped groove at an angle of forty-five degrees with respect to the horizontal plane of the record disc. Thus, the two modulated channels of stereophonic sound are disposed in an angular relation of ninety degrees with respect to each other. One would therefore assume that to provide maximum efficiency and faithfulness of output, the major faces of the transducer elements 30 and 31 should be disposed at an angle of ninety degrees with respect to each other and this is exactly the arrangement which is embodied in the teachings of the prior art. Such, however, is not the disposition of the transducer elements 30 and 31 in the stereophonic phonograph pickup cartridge of the present invention. As shown in FIGURE 8 of the drawing the transducer elements are orientated in such a manner that imaginary planes 37 and 38 drawn through the transducer elements 30 and 31, respectively, in parallel relation with respect to the major faces thereof intersect at an angle of substantially less than ninety degrees to obtain maximum channel separation. We have found that positioning the transducer elements in this manner compensates for the asymmetrical mounting and the non-uniform strength to bending of the assembled transducer elements thereby providing maximum channel separation as will be hereinafter more fully described.

In assembling the transducer elements 30 and 31 the same are disposed at the desired angle of less than ninety degrees with respect to each other and are rigidly secured to each other adjacent the forward ends thereof by a blob of very hard and glassy cement 39. Both transducer elements are held in accurate parallel alignment until the cement has completely hardened.

When the cement 39 has hardened the nose piece or coupling member 34 is secured by cement or any other convenient attachment means to the cemented forward ends of the transducer elements 30 and 31. The nose piece 34 is preferably made of resilient plastic material, such as nylon, for example, and, when the stereophonic phonograph pickup cartridge is completely assembled, extends from the ends of the transducer elements 30 and 31 through the substantially square front portion 27 of the internal cavity 23 to a point adjacent the radiused forward edges 28 of the side walls of the cartridge housing. The nose piece serves to support adjacent its forward end a pair of wear resistant record groove engaging styli or tips 41 and 42 which extend vertically in generally opposite directions. It is preferred that two different styli be provided, each having a different size finished point. For example, stylus 41 may have a seven tenths of a mil point for playing microgroove record discs while stylus 42 may have a three mil point for playing the coarser groove record discs which usually rotate at seventy-eight revolutions per minute. Alternately, both styli 41 and 42 may have similar points to thereby extend the useful life of the stereophonic phonograph pickup cartridge. The nose piece 34 performs the function of transmitting the undulations sensed by either of the styli to the transducer elements 30 and 31 depending upon which wall of the record groove bears the recorded signal. In this manner the nose piece serves as a coupling member between the styli and the transducer elements but it should be clearly understood that the nose piece does not couple the transducer elements to each other due to the hard nature of the blob of cement 39 and the means employed for attaching the transducer elements to the nose piece as will be hereinafter more fully explained.

Figures 4, 5, 6:
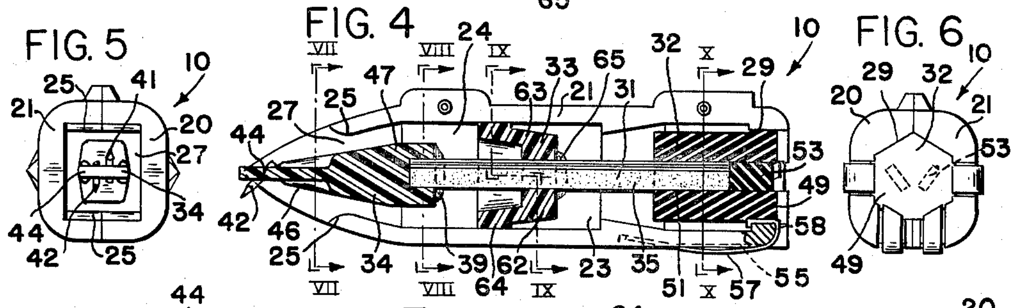
FIGURE 4 is a longitudinal side sectional view of the pickup cartridge of the present invention as seen from the vertical section line IV—IV of FIGURE 3.
FIGURES 5 and 6 are front and rear end views, respectively, of the stereophonic phonograph pickup cartridge shown in any of the preceeding views.

As will be noted in FIGURE 4 of the drawing, the left or forward end 44 of the nose piece 34 is quite thin in a vertical direction—that is in a direction generally normal to the horizontal plane of an associated record disc. This slight thickness dimension increases the vertical compliance or flexibility of the nose piece in this area and also substantially reduces the mass which is allowed to react against the surface of the record disc. Since the mass reacting against the surface of the record disc is relatively small, undesirable and objectionable needle talk or chatter radiated directly from the surface of the record disc is substantially reduced and effectively mitigated.

Near the opposite lateral edges of the forward end 44 of the nose piece 34 there are provided a pair of vertically extending tapered flanges 45 and 46 which increase in cross section as they extend toward the transducer elements 30 and 31 and away from the styli 41 and 42. These flanges give the nose piece 34 a generally H-shaped cross section throughout the center portion of its length as is clearly shown in FIGURE 7 of the drawing. The flanges 45 and 46 provide substantial torsional rigidity to the nose piece whereby movement of the nose piece in transmitting the undulations of the modulated channels of the record groove is limited to generally vertical and lateral directions or the summation of the two. It should be noted that the tapering of the flanges 45 and 46 is advantageous in that it provides the extra thickness to resist the torsional movements of the nose piece at exactly the points where it is most needed.

By the provision of the flanges 45 and 46 it is possible to effectively eliminate torsional resonance from the stereophonic phonograph pickup cartridge. To further reduce the possibility of applying torsional stresses to the transducer elements the styli 41 and 42 are kept as short as possible and are disposed as near as possible to the centerline of the nose piece 34. In this manner the effective length of the resultant lever acting to drive the transducer elements is kept at a minimum and the forces applied to the nose piece 34 are substantially lateral and vertical rather than torsional.

The enlarged rear end 47 of the nose piece 34 is provided with suitable angularly disposed notches 48 to partially embrace the forward ends of the transducer elements 30 and 31 as shown in FIGURE 8 of the drawing. The coupling which the nose piece 34 exerts between the two transducer elements 30 and 31 is minimal because of the open nature of the notches and because of the relatively hard nature of the blob of cement 39 as compared to the relatively soft and resilient material of the nose piece 34.

Disposed at the right or rear end of the internal cavity 23 is the clamping bushing 32 which is molded or otherwise formed from a relatively dead and medium soft rubber-like material. The clamping bushing has a generally cylindrical contour throughout the greater portion of its length but the extreme rear end thereof is formed in an irregular hexagonal shape 49 as is most clearly shown in FIGURE 11 of the drawing. A pair of rectangular apertures 50 and 51 are formed in the clamping bushing for receiving the rear ends of the transducer elements 30 and 31. The apertures 50 and 51 are disposed on opposite sides of the centerline of the hexagonally shaped rear end 49 of the clamping bushing and are positioned so that a centerline bisecting the major flat vertical surfaces of the hexagonally shaped rear end of the clamping bushing symmetrically intersects the transducer elements 30 and 31.

It is, of course, necessary to provide electrical leads which communicate with the conductive coatings on the opposite sides of the transducer elements and an improved, inexpensive and highly efficient method has been developed for providing these electrical leads during the assembly of the clamping bushing to the rear ends of the transducer elements 30 and 31. According to the teachings of the present invention, a strip of metal foil 52 which is slightly narrower than the major faces of the rectangular apertures 50 and 51 is laid across the left or forward end of each of these rectangular apertures to bridge the same. Then the rear ends of the transducer elements 30 and 31 are pressed into the rectangular apertures 50 and 51, respectively, thereby pushing the center portion of each of the strips of metal foil 52 into the apertures 50 and 51. Upon continued movement of the transducer elements relative to the clamping bushing the center portions of the strips of metal foil 52 will be pushed through the apertures 50 and 51 and project beyond the hexagonally shaped right or rear end face of the clamping bushing. At this time, as should be apparent, the strips of metal foil 52 are formed into a pair of U-shaped hairpin-like members which interconnect the side surfaces of each of the transducer elements 30 and 31.

Figure 3:
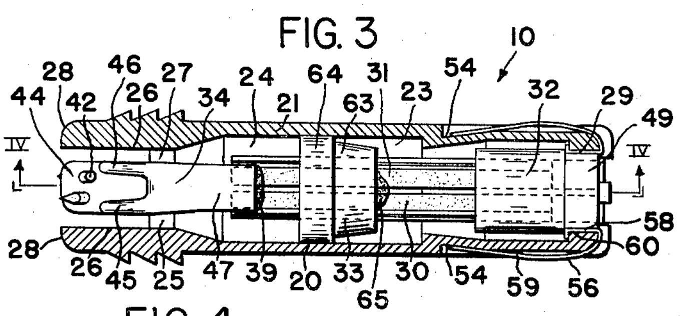
FIGURE 3 is a plan sectional view of the stereophonic phonograph pickup cartridge taken along the section line III—III of FIGURE 1.

The protruding looped center portions of the strips of metal foil are retained in this position and the transducer elements 30 and 31 are drawn forwardly to their final position of insertion which is shown in FIGURES 3 and 4 of the drawing. It will be noted that the extreme rear ends of the transducer elements do not extend into the hexagonally shaped rear end 49 of the clamping bushing 32 and, in fact, are disposed a substantial distance forwardly thereof. The protruding loops of the strips of metal foil are next cut at their center points and small rectangular insulating plugs 53 are then inserted into the rear ends of the rectangular apertures 50 and 51. These plugs separate the two strands of metal foil in each of the apertures and effectively insulate and isolate the strands from each other. Each strand or severed half strip of metal foil is now independent of the other strands and makes contact with the conductive coating on only one major face of the transducer element associated therewith and extends outwardly through one of the plugged apertures in the clamping bushing. For convenience in the later description of the invention these individual strands are designated by the reference indicia 52A, 52B, 52C and 52D as shown in FIGURE 11 of the drawing.

In each of the housing halves 20 and 21 adjacent the rear ends and about the outer periphery thereof there are provided a pair of integrally formed generally rectangular longitudinally extending recesses 54 and 55. The recesses 54 are disposed along the longitudinal center line of the side walls of the housing halves while the recesses 55 are disposed on the bottom walls of the housing halves adjacent the flat meeting surfaces thereof. Received within the recesses 54 and 55 are pairs of spring terminals 56 and 57, respectively. The pairs of spring terminals are substantially identical, each spring terminal comprising a properly bent piece of resilient and conductive strip metal material, such as Phosphor bronze, for example, defining a short leg portion 58 and a long leg portion 59. The short leg portions 58 of the spring terminals rest within channels 60 provided on the internal surface of the hexagonally shaped rear portion 29 of internal cavity 23 whereby, when the housing halves are assembled in clamping relation with respect to the clamping bushing 32, all of the spring terminals are mounted with their long leg portions secured by spring action in their respective recesses 54 and 55.

The spring terminals 56 and 57 provide a means for transferring the generated electrical signals from the strands of metal foil 52A–52D to the electrical terminals 17 and 18 of the cartridge holder. It is thus necessary to effect electrical contact between the strands of metal foil and the spring terminals. A preferred method of accomplishing this is by bending the strands 52A and 52B and pressing the same into substantially the position shown in FIGURE 11 of the drawing with the ends thereof lying smoothly along the major flat vertically extending and spaced parallel faces of the hexagonally shaped rear end 49 of the clamping bushing 32. With the strands 52A and 52B so positioned, the rear surface of the clamping bushing 32, as well as the portions of the strands 52A and 52B extending thereacross, is coated wth an insulating adhesive, such as Glyptal, for example, and this adhesive is allowed to dry. The remaining strands 52C and 52D of metal foil are now smoothed downwardly over the end surface of the clamping bushing 32 and their ends are bent inwardly to lie against the lower converging flats of the hexagonally shaped rear end 49 of the clamping bushing 32. A final coating of insulating adhesive is applied to the rear surface of the clamping bushing 32 and the portions of the strands 52C and 52D extending thereacross. When this second coating of insulating adhesive dries the four strands of metal foil are sealed in insulated relation to the rear surface of the clamping bushing and the downturned ends thereof are positioned adjacent the channels 60 in the housing halves 20 and 21 when the same are assembled in clamping relation with respect to the clamping bushing.

Due to the relatively long taper of the faces of the hexagonally shaped rear end 49 of the clamping bushing 32 with respect to the hexagonally shaped rear portion 29 of the internal cavity 23 defined by the housing halves 20 and 21, it will be evident that the housing halves may be brought together against the clamping bushing without disturbing the position of the downturned ends of the strands 52A–52D. This is especially true of the strands 52C and 52D. When the cartridge housing is completely assembled the housing halves will securely clamp the hexagonally shaped rear end 49 of the clamping bushing by applying substantial pressure to the vertical faces thereof and causing the entire resilient mass thereof to completely fill the hexagonally shaped rear portion 29 of the internal cavity 23. The clamping bushing is not only securely held with respect to the cartridge housing but also good electrical contact between the ends of the strands 52A–52D and the short leg portions 58 of the spring terminals 56 and 57 is insured. It will be noted that the spring terminals 56 and 57 on each of the housing halves define pairs of spring terminals which are each associated with one of the transducer elements 30 and 31. Thus, the spring terminals 56 and 57 on the housing half 20 are in electrical contact with the conductive faces on the transducer element 30 via the strands of metal foil 52B and 52D while the spring terminals on the housing half 21 are connected to the transducer element 31 by the strands of metal foil 52A and 52C. It should be apparent the above described method and apparatus are characterized by their utmost simplicity but yet the clamping bushing is securely held and excellent electrical connections between the spring terminals and the transducer elements are afforded.

Before assembling clamping bushing and the transducer elements in the manner above described to provide the requisite electrical connections and to clamp the clamping bushing, the bender bushing 33 is inserted over the rear ends of the transducer elements 30 and 31 and moved to the position shown in FIGURES 3 and 4 of the drawing which is approximately at the center of free unsupported length of the transducer elements. The clamping bushing is generally cup shaped, having a relatively thick bottom wall 62, a tapering side wall 63 and an outwardly disposed radially projecting and circumferentially extending flange 64 adjacent the forward end of the side wall 63. The bottom wall 62 is provided with a pair of divergently related rectangular slots (see FIGURE 9) which are adapted to loosely receive the transducer elements 30 and 31. The bender bushing 33 is preferably molded or otherwise formed from a relatively soft rubber-like material, such as vinyl plastisol, for example.

After the bender bushing 33 is positioned over the transducer elements a large blob of flexible plastic cement 65 is applied behind the bender bushing to the transducer elements 30 and 31. This blob of cement 65 is of sufficient size to fill the space between the tranducer elements and adheres securely to both of the transducer elements when the same dries. The blob of cement 65, however, is not allowed to adhere to the bender bushing 33. After complete assembly of the stereophonic phonograph pickup cartridge the rear surface of the bottom wall 62 of the bender bushing bears lightly against the blob of cement 65 which serves as an abutment stop to prevent accidental dislodgement of the internal assembly of the pickup cartridge as might result from rough handling during installation or use of the pickup cartridge.

After the housing halves 20 and 21 are brought together the center portion 24 of generally cylindrical shape of the internal cavity 23 engages and bears against the circumferential flange 64 of the bender bushing to firmly and securely hold the same in the desired position. The bender bushing 33 provides a yieldable support over which the transducer elements are adapted to bend upon the urging of either of the styli 41 or 42 and the nose piece 34. The bender bushing also exercises a damping action on the transducer elements 30 and 31 and thereby helps to determine the overall mechanical resonance of the system. The construction and shape of the bender bushing is such that clamping pressures are applied to the flange 64 which is spaced forwardly of the bottom wall 62 whereby compressive clamping pressures are not applied to the transducer elements.

It should now be apparent that the above described preferred embodiment of a stereophonic phonograph pickup cartridge accomplishes the objects initially set forth. Extreme simplicity in construction and highly efficient use of a minimum number of component parts, together with a substantial reduction in overall size, allow the production of a relatively inexpensive stereophonic phonograph pickup cartridge. Also contributing to the economy of manufacturing the pickup cartridge of the present invention is the provision of a design and methods for utilizing accurately stamped and molded parts and the provision of methods of assembly of a highly simplified and unique character. The employment of the single unitary nose piece 34 allows significant reduction in size and cost savings in manufacture since the complicated and bulky lever systems which have characterized similar prior art apparatus are completely eliminated. The small size of the stereophonic phonograph pickup cartridge is important since the same may be employed in cartridge holders and tone arms which were originally designed to hold pickup cartridges having only one transducer element without substantial modification of the holder, mounting bracket, tone arm, etc.

The use of the single nose piece of the design above described is particularly advantageous. Not only is the cost of the resultant pickup cartridge substantially reduced but also the same has better operating characteristics. The provision of a relatively thin front portion for the nose piece provides the pickup cartridge with a maximum of vertical flexibility while yet a minimum of mass is presented to the surface of an associated record disc. The laterally spaced and tapering flanges on the side edges of the nose piece, in combination with the efficient mounting of the styli, effectively eliminate torsional forces from being applied to the transducer elements and this therefore eliminates the problem of torsional resonance from the pickup cartridge. Of course, the nose piece can be dimensioned as desired to produce the desired degree of mass, vertical flexibility, torsional resistance, etc. As an example, if more vertical flexibility is desired the front portion of the nose piece might have a slightly smaller thickness dimension although this might reduce the torsional resistance of the nose piece. Thus, even though the dimensions of the nose piece are selected on a compromise basis to obtain the desired pickup cartridge characteristics, it is possible to alter the dimension within certain tolerances to thereby control the properties of any given pickup cartridge.

The nose piece also provides excellent coupling between the operative stylus and the two transducer elements whereby these elements are driven in exact accordance with the mechanical undulations of the channels of stereophonic sound associated therewith. However, the nose piece is operatively coupled to the free ends of the transducer elements in such a manner that there is no appreciable coupling between the two transducer elements whereby channel separation is greatly improved. The nose piece is operative to transmit the undulations experienced by the operative stylus due to one of the channels of stereophonic sound in the record groove or trace to the transducer element associated therewith without driving the other of the transducer elements.

One aspect of the design of the stereophonic pickup cartridge of the present invention is that the side walls of the housing halves effectively encase the forwardly extending end portion of the nose piece to protect the nose piece and the transducer elements from rough handling, etc. In addition, the radiused forward edges of the sidewalls of the housing halves serve as bumpers to prevent damage to the pickup cartridge. Thus, if the tone arm and pickup cartridge happen to be dropped on the surface of a record disc (not an uncommon occurrence) the bumpers will engage the surface of the record disc to limit vertical deflection of the styli and the forward end of the nose piece. This, in combination with the clamping and bender bushings, prevents damage to the relatively fragile and sensitive transducer elements.

As explained previously, maximum channel separation is obtained by positioning the two tranducer elements at an angle of less than ninety degrees with respect to each other. It will be noted that in the assembled stereophonic phonograph pickup cartridge the two transducer elements appear as a beam of non-uniform strength throughout its length due to the use of the various blobs of cement, the bender bushing and the clamping bushing. Although it would appear that the transducer elements should be mounted with an angular relationship of ninety degrees with respect to each other since the channels of stereophonic sound are disposed at ninety degrees with respect to each other, we have found that mounting these elements at an angle of less than ninety degrees compensates for the non-uniform strength characteristics of the beam defined by the transducer elements and the asymmetrical mounting thereof to afford maximum channel separation. In essence, the transducer elements mounted at an angle of less than ninety degrees appear as a beam of uniform strength to signals which are ninety degrees opposed. This obviously increases the utility and performance characteristics of the stereophonic phonograph pickup cartridge of the present invention.

Another particularly important aspect of the present invention is the improved manner in which the transducer elements are secured together and mounted with respect to each other. The blob of cement 39 at the forward or driven ends of the transducer elements is, when the same dries, very hard and of a glassy nature. Thus, the transducer elements are securely and rigidly joined and held in spaced relation adjacent their driven end. The rear ends of the transducer elements are anchored in the clamping bushing 32 which is formed from a relatively dead rubber-like material. In this manner the rear ends of the transducer are held in spaced generally parallel relation but are not coupled or secured to each other due to the properties of the rubber-like material forming the clamping bushing. The arrangement is such that the transducer elements are rigidly secured to each other adjacent their driven ends while the rear or anchored ends thereof are not secured to each other. Also, the bender bushing does not provide a means for securing the transducer elements intermediate their ends because of the compliant nature of the same. The secured transducer elements provide a beam-like structure wherein the transducer elements are secured to each other at one set of their ends by the cement 39 but are not secured throughout the rest of their length although the same are anchored and held in spaced generally parallel relation by the clamping and bender bushings. When a moving force is applied to the driven ends of the transducer elements the same will react in bending as a beam of non-uniform strength due to the blob of cement rigidly fastening the same together and the mounting thereof by the clamping and bender bushings.

The unusual manner in which the clamping bushing and the bender bushing support the transducer elements provides a stereophonic pickup cartridge having a high degree of compliance and which is therefore adapted to very faithfully and efficiently reproduce the recorded stereophonic sound. The clamping bushing exerts a relatively secure restraining force on the rear ends of the transducer elements 30 and 31 without subjecting them to undue compressive forces as are applied to the transducer elements by the clamping pads in prior art phonograph pickup cartridges. The hexagonally shaped rear end of the clamping bushing is securely held between the housing valves but the cylindrically shaped front portion thereof is free of all compressive restraint. Since the transducer elements extend only partially into the interior of the cylindrically shaped front portion of the clamping bushing it should be evident that no compressive forces are brought to bear directly against the transducer elements. Also, it will be noted that the cylindrical shaped front portion of the clamping bushing is subjected only to shear forces.

As mentioned above, the bender bushing supports and exerts a restraining force on the transducer elements. However, the side wall of the bender bushing is subjected only to shear forces due to the fact that the housing halves, when assembled, clamp against the flange of the bender bushing.

Thus, only shear forces are applied to the side wall of the bender bushing and the cylindrically shaped front portion of the clamping bushing when either or both of the transducer elements are flexed and compressive forces are not applied to the transducer elements in any manner. The utilization of this particular arrangement for supporting the transducer elements is in accordance with the known elastomer techniques. The behavior of rubber-like material under forces applied in shear, as is the case in the phonograph pickup cartridge of the present invention, is much more linear than when forces are applied to such materials in either compression or tension. Thus, the transducer elements are adapted to be uniformly supported over a much greater range of deflection than would be possible if the clamping and bender bushings were stressed in compression or tension.

Another important aspect of the arrangement used in mounting the transducer elements in the stereophonic pickup cartridge of the present invention is that the clamping and bender bushings are substantially symmetrical in planes transverse to the two transducer elements to provide almost equal compliance in all directions. In other words, compliance is provided through three hundred and sixty degrees about the centerline of the two transducer elements. This is particularly significant since the stereophonic signals have components of motion in all directions about the centerline of the record groove or trace. The uniform compliance of the stereophonic pickup cartridge of the present invention allows the operative stylus to track a record disc faithfully with a minimum of wear upon the record disc and the stylus. The extreme ease with which the operative stylus can be displaced and the rapidity with which it will return to its neutral position is an indication of the ability of the pickup cartridge to perform with fidelity.

The ease and assurance with which the pickup cartridge is assembled—particulary the manner in which the electrical connections are provided between the transducer elements and the terminal strips—also contribute to the relatively low cost and efficient operation of the device. The several strands of metal foil each make secure contact with the transducer elements, are maintained in isolation with respect to each other end and are firmly pressed into contact with the spring terminal upon final assembly of the pickup cartridge.

One other very important advantage of the stereophonic pickup cartridge of the present invention is worthy of note. This is that the pickup cartridge, while being specifically designed for use with stereophonic reproducing systems, is entirely compatible with monaural systems. Thus, the pickup cartridge is not only adapted to be used with stereophonic record discs but also may be used with monaural record discs as is readily apparent. A simple switch-over is made in the leads of the amplifier so that only the lateral component of stylus motion is reproduced in both output channels and none of the vertical component is reproduced in either output channel.

Although we have shown and described an illustrated embodiment of the present invention it should be apparent that many changes may be made therein without departing from the clear teachings of the invention. Accordingly, reference should be had to the following appended claims in determining the true scope of the invention.

We claim:

1. A sterephonic phonograph pickup cartridge for use in the reproduction of stereophonic sound from stereophonic record discs and the like having two channels of stereophonic information recorded thereon in a single groove with said channels of stereophonic information being modulated in directions ninety degrees opposed to each other comprising a cartridge housing, said cartridge housing having a cavity therein, a pair of piezoelectric transducer elements, each of said elements comprising a pair of thin elongated strips of piezoelectric material secured to a center vane and having conductive coatings on the outer major faces of said strips of piezoelectric material, a clamping bushing mounted in said cavity and mounting one set of ends of said transducer elements, said transducer elements extending in spaced and generally parallel relation within said cavity, a record groove engaging stylus, a nose piece mounting said stylus carried on the other set of ends of said transducer elements, said nose piece coupling said stylus to said transducer elements whereby each of said transducer elements is adapted to be driven from one of said channels, and the planes of said major faces of said transducer elements being outwardly splayed with respect to each other but intersecting at an angle of less than ninety degrees to render each of said transducer elements responsive to only one of said channels of stereophonic information, said nose piece comprising a front portion having a thin vertical dimension and an enlarged rear portion, said stylus being mounted from said front portion, said rear portion having a pair of open angularly related slots therein for receiving said other set of ends of said transducer elements, said nose piece further comprising a pair of laterally spaced vertically extending flanges on the side edges of said front portion, said flanges increasing in thickness dimension as they extend toward said rear portion, and said nose piece being formed from a compliant material.

2. A stereophonic reproducing device comprising a pair of flat elongated transducer elements having major faces and arranged in side-by-side relation, means securing said transducer elements together at one set of ends thereof, means separately and yieldingly supporting said transducer elements at the other ends thereof, said transducer elements appearing jointly as a beam of non-uniform strength, a common record-groove-engaging stylus tip, common connecting means operatively connecting said stylus tip to said transducer elements at the first mentioned ends thereof, and means to support said transducer elements in splayed relation to each other whereby the planes of the major faces thereof intersect at a certain angle so that said transducer elements respond equally and independently to opposed signals applied to said stylus tip at an angle other than said certain angle.

3. A device according to claim 2 further including a nose piece for mounting said stylus tip, said nose piece being rigidly connected to the first mentioned ends of said transducer elements and comprising said common connecting means.

References Cited by the Examiner

UNITED STATES PATENTS

| | | | |
|---|---|---|---|
| 2,093,540 | 9/37 | Blumlein | 179—100.41 |
| 2,114,471 | 4/38 | Keller | 179—100.41 |
| 2,280,763 | 4/42 | Hasbrouck | 179—100.41 |
| 2,492,446 | 12/49 | Schumann | 179—100.41 |
| 2,594,841 | 4/52 | Arndt | 310—8.6 X |
| 2,650,953 | 9/53 | Gunter | 179—100.41 |
| 2,689,737 | 9/54 | Munro | 274—3 |
| 2,749,131 | 6/56 | Kelly | 274—37 |
| 2,775,460 | 12/56 | Shivack | 179—100.41 |
| 2,798,120 | 7/57 | Sabol | 179—100.41 |
| 2,825,763 | 3/58 | De Vries | 179—100.41 |
| 2,858,373 | 10/58 | Hollmann | 179—100.41 |
| 2,934,610 | 4/60 | Dieter | 179—100.41 |
| 2,955,170 | 10/60 | Dieter | 179—100.41 |
| 2,818,632 | 1/62 | Hammell | 29—155.55 |
| 3,043,921 | 7/62 | Hester | 179—100.41 |
| 3,086,282 | 4/63 | Cootes et al. | 29—155.55 |

FOREIGN PATENTS 686,777 1/53 Great Britain.

OTHER REFERENCES

German printed application T 11,092, Batsch, December 13, 1956.

IRVING L. SRAGOW, *Primary Examiner.*

L. MILLER ANDRUS, NEWTON N. LOVEWELL, BERNARD KONICK, *Examiners.*